US006801935B2

(12) United States Patent
Shen

(10) Patent No.: US 6,801,935 B2
(45) Date of Patent: Oct. 5, 2004

(54) SECURE PRINTING USING ELECTRONIC MAILBOX

(75) Inventor: Ming-Teh Shen, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/461,205

(22) Filed: Dec. 14, 1999

(65) Prior Publication Data

US 2003/0187951 A1 Oct. 2, 2003

(51) Int. Cl.[7] ................ G06F 15/16; G06F 11/30; G06F 12/14; H04L 9/00; H04L 9/32; G06K 1/00
(52) U.S. Cl. ............. 709/219; 709/203; 713/201; 358/1.14; 358/1.15
(58) Field of Search .............. 709/203, 207, 709/219, 206, 217, 232; 713/201; 358/1.14, 1.15

(56) References Cited

U.S. PATENT DOCUMENTS

| | | | |
|---|---|---|---|
| 4,713,780 A | 12/1987 | Schultz et al. ............ 364/514 |
| 5,351,136 A | 9/1994 | Wu et al. .................. 358/440 |
| 5,602,973 A | 2/1997 | Nishiwaki ................ 395/113 |
| 5,633,932 A | 5/1997 | Davis et al. ............... 380/25 |
| 5,802,260 A * | 9/1998 | Shimakawa et al. ...... 358/1.15 |
| 5,873,659 A * | 2/1999 | Edwards et al. ............ 400/61 |
| 5,956,471 A * | 9/1999 | Ueda et al. ............... 358/1.14 |
| 6,067,560 A * | 5/2000 | Potts, Jr. .................. 709/203 |
| 6,092,102 A * | 7/2000 | Wagner | |
| 6,148,403 A * | 11/2000 | Haneda et al. ............ 713/200 |
| 6,160,631 A * | 12/2000 | Okimoto et al. | |
| 6,163,383 A * | 12/2000 | Ota et al. ................. 358/1.1 |
| 6,185,604 B1 * | 2/2001 | Sekiguchi ................. 709/206 |
| 6,216,113 B1 * | 4/2001 | Aikens et al. ............. 705/34 |
| 6,223,216 B1 * | 4/2001 | Nalder ..................... 709/217 |
| 6,240,409 B1 * | 5/2001 | Aiken ....................... 707/4 |
| 6,272,485 B1 * | 8/2001 | Sragner .................... 707/1 |
| 6,310,692 B1 * | 10/2001 | Fan et al. ................. 358/1.14 |
| 6,314,521 B1 * | 11/2001 | Debry ...................... 713/201 |
| 6,337,745 B1 * | 1/2002 | Aiello et al. .............. 358/1.15 |
| 6,348,970 B1 * | 2/2002 | Marx ....................... 358/1.15 |
| 6,348,972 B1 * | 2/2002 | Taniguchi et al. ......... 358/1.15 |
| 6,349,328 B1 * | 2/2002 | Haneda et al. ............ 709/206 |

(List continued on next page.)

FOREIGN PATENT DOCUMENTS

JP  11-150559  6/1999

OTHER PUBLICATIONS

Denis, A. and Kinsner, W. "Secure and Resilient Data Printed on Paper" Proceedings of the 1999 IEEE Canadian Conference on Electrical and Computer Engineering, vol.: 1, May 2, 1999, pp. 245–248.*
Wong, Ping Wah, et al. "A Web–based Secure System for the Distributed Printed of Documents and Images" Image Processing, 1998. ICIP 98. Proceedings 1998 International Conference on, Oct. 7, 1998, pp.: 2–6 vol. 3.*
"Xerox Introduces First Office Laser Printer To Keep Private Documents 'Private'", Xerox, Inc., (Feb. 10, 1999) (2 pages) <http://www.xerox.com/PR/NR960129–printer.htm>.
"M@iLnX", Xerox, Inc. (2 pages) Published date unknown.

*Primary Examiner*—Rupal Dharia
*Assistant Examiner*—Melvin H. Pollack
(74) *Attorney, Agent, or Firm*—Fitzpatrick, Cella, Harper & Scinto

(57) ABSTRACT

A system usable by a printing device to print a document. The system includes receiving an e-mail address, a user ID and a password corresponding to an e-mail account, displaying a list of one or more documents stored in the e-mail account, retrieving a document from the e-mail account, and printing the document. In a further aspect, the system includes displaying a list of documents stored in the e-mail account, selecting the document from the list, inputting a first security code into the printing device, and determining whether the first security code is identical to a second security code corresponding to the document.

19 Claims, 10 Drawing Sheets

U.S. PATENT DOCUMENTS

| | | | |
|---|---|---|---|
| 6,378,070 B1 * | 4/2002 | Chan et al. | 713/155 |
| 6,385,655 B1 * | 5/2002 | Smith et al. | 709/232 |
| 6,426,799 B1 * | 7/2002 | Okimoto et al. | 358/1.15 |
| 6,438,574 B1 * | 8/2002 | Nagashima | 709/102 |
| 6,456,987 B1 * | 9/2002 | Pauschinger | |
| 6,469,796 B1 * | 10/2002 | Leiman et al. | 358/1.15 |
| 6,480,958 B1 * | 11/2002 | Harrington | 713/184 |
| 6,487,189 B1 * | 11/2002 | Eldridge et al. | 370/338 |
| 6,525,831 B1 * | 2/2003 | Evans, IV | 358/1.15 |
| 6,587,861 B2 * | 7/2003 | Wakai et al. | 715/500 |
| 6,606,162 B1 * | 8/2003 | Simpson | 358/1.15 |
| 6,615,434 B1 * | 9/2003 | Davis et al. | |
| 2003/0172115 A1 * | 9/2003 | Motoyama | 709/206 |

* cited by examiner

SECURE PRINTING USING ELECTRONIC MAILBOX

BACKGROUND OF THE INVENTION

1. Field of the Invention

The present invention concerns systems for printing private documents on a shared printer. More particularly, the present invention relates to a system in which private documents are sent to an electronic mailbox and retrieved therefrom by a printer upon entry of identification information into the printer.

2. Description of the Related Art

Conventional computing networks are used to share computing resources. Examples of shared resources are file servers and peripherals, such as scanners, facsimile machines and printers. Printers are the most commonly shared of these peripherals.

Printer sharing is common because a single networked printer can usually handle the printing needs of several users. As a result, the single networked printer can be purchased as an alternative to purchasing separate printers for each user. However, the resultant cost savings come at the expense of printing privacy. That is, since conventional systems allow several users to send print jobs to a single printer, these systems must also allow each of the several users to access documents output by the printer. As a result, in order to ensure that no unauthorized persons view a private document, a sender of the document must race to a shared printer to retrieve a hardcopy of the document as soon as it is output from the printer.

Several systems have recently been developed in an attempt to address the foregoing problems. For example, Xerox offers a network printer having locked storage bins to which sensitive documents are delivered after printing. A user enters a security code in order to unlock the bins and retrieve the documents inside. However, additional print jobs cannot be sent to a bin once the bin is full. In addition, a user can only retrieve documents from the particular printer to which he has sent a print job. U.S. Pat. No. 5,602,973, assigned to Ricoh Company, Ltd., also describes a system for delivering a printout to a locked printing bin and for allowing access to the bin upon entry of an appropriate identification code. This system suffers from problems similar to those of the above Xerox system.

In view of the foregoing, what is needed is a system for securely printing to a networked printer which allows a large number of print jobs to be delivered to the printer and which allows a document to be securely retrieved from any networked printer.

SUMMARY OF THE INVENTION

The present invention addresses the foregoing by providing a printing apparatus which receives an e-mail address, a user ID and a password corresponding to an e-mail account, retrieves a document from the e-mail account, and prints the document. By virtue of this arrangement, a printing apparatus according to the present invention can retrieve and print a document previously stored in a user's e-mail account. As a result, the document can be printed on any printing apparatus embodying the invention. Moreover, the document can only be accessed by a person knowing each of the e-mail address, user ID and password. In addition, the present invention provides a larger storage space and longer queue time for print jobs than that available in conventional systems.

In another aspect, the present invention is a system to print a document in which an e-mail address is input, the document is sent to an e-mail account corresponding to the input e-mail address, the e-mail address, and a user ID and password corresponding to the e-mail account are input into a printing device, and the document is printed by the printing device.

The foregoing aspect allows a user to send print jobs to an e-mail account and retrieve the print jobs from a printer by entering a user ID and a password. Also, the documents cannot be accessed by a person who does not know the e-mail address, user ID and password corresponding to the e-mail account. This aspect of the invention provides, in addition, a larger storage space and longer queue time for print jobs than that available in conventional systems.

In an additional aspect, a first security code is input along with the e-mail account address, a list of documents stored in the e-mail account is displayed, the list including the document, the document is selected from the list, a second security code is input into the printing device, and it is determined whether the first security code is identical to the second security code. By virtue of the foregoing additional aspect, an extra layer of security is added to the invention. In particular, each document located in the e-mail account is associated with an security code, and the security code must also be input to the printing device before printout of the document.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

Figure 1:
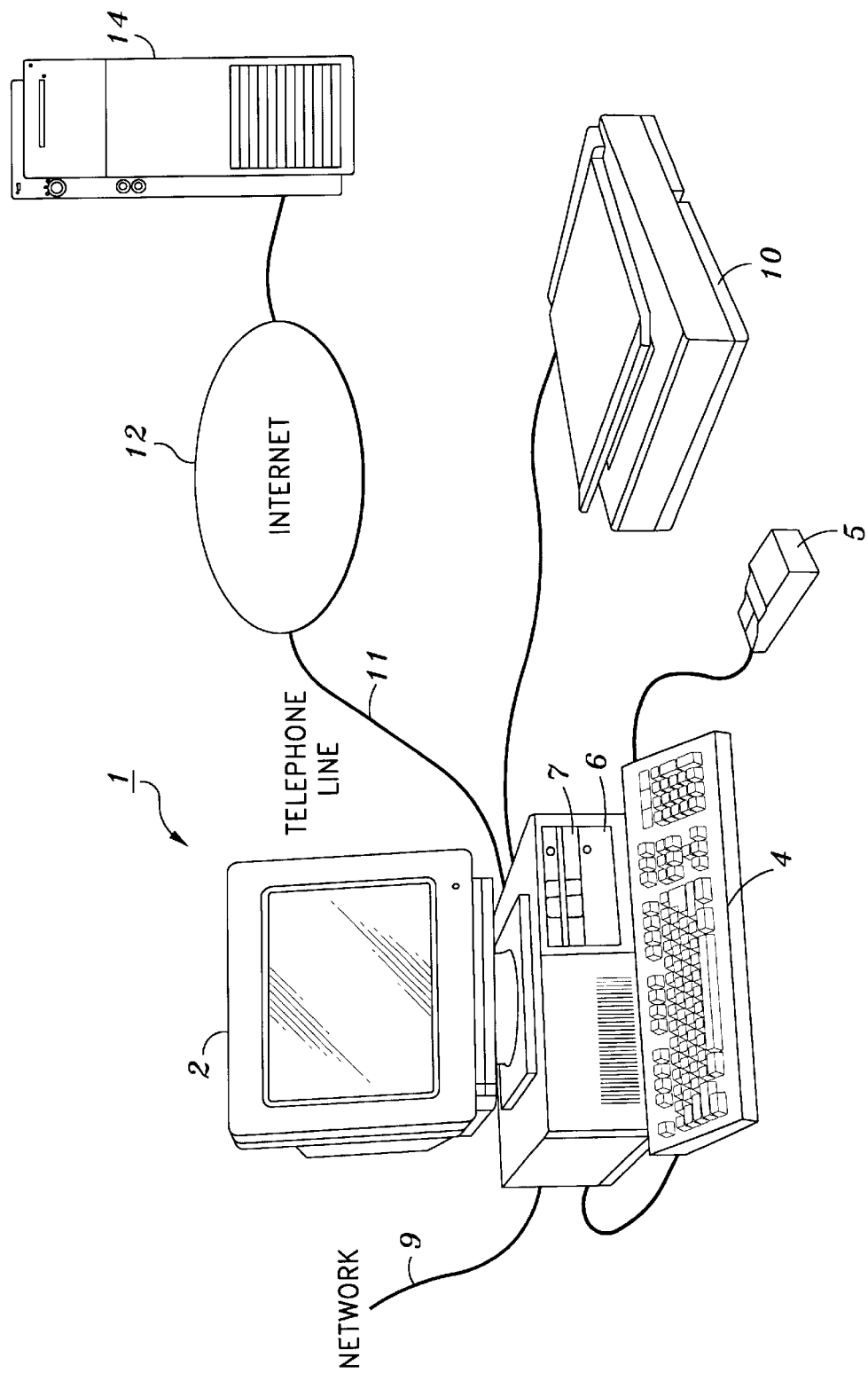
FIG. 1 is an outward view of a hardware configuration embodying the present invention.

FIG. 1 is an outward view of a representative computing system utilizing the present invention.

Computing equipment 1 is preferably an Intel® Pentium®-based computer executing a windowing operating system such as Microsoft Windows98®. Computing equipment 1 includes display 2 for displaying images to a user, keyboard 4 for entering text and commands into appropriate fields displayed on display 2, and pointing device 5, such as a mouse, for pointing to, selecting and manipulating objects displayed on display 2.

Fixed disk 6 stores data files and computer-executable process steps of the windowing operating system and of other applications and device drivers executed by computing equipment 1.

Floppy disk drive 7 provides an interface to computing equipment 1 for reading data from and writing data to a floppy disk inserted therein. Using floppy disk drive 7, computer-executable process steps and/or data files may be input to computing equipment 1 and stored on fixed disk 6. Computer-executable process steps and data files may also be retrieved over a network via network connection 9, and scanned-in data of documents and images may be received from scanner 10.

Computer-executable process steps and data files may also be received by computing equipment 1 over telephone line 11, which connects to Internet 12. These files are transferred thereto by web servers such as web server 14. Specifically, in response to a request for data, server 14 collects the required data, properly formats the data, and sends the data to computing equipment 1 over Internet 12.

Computing equipment 1 can also upload data to Internet 12 via telephone line 11. In this regard, computing equipment 1 may execute an electronic mail (e-mail) application to upload an e-mail message to Internet 12 for eventual delivery to an appropriate electronic mailbox. Such message delivery will be described in greater detail below.

Figure 2:
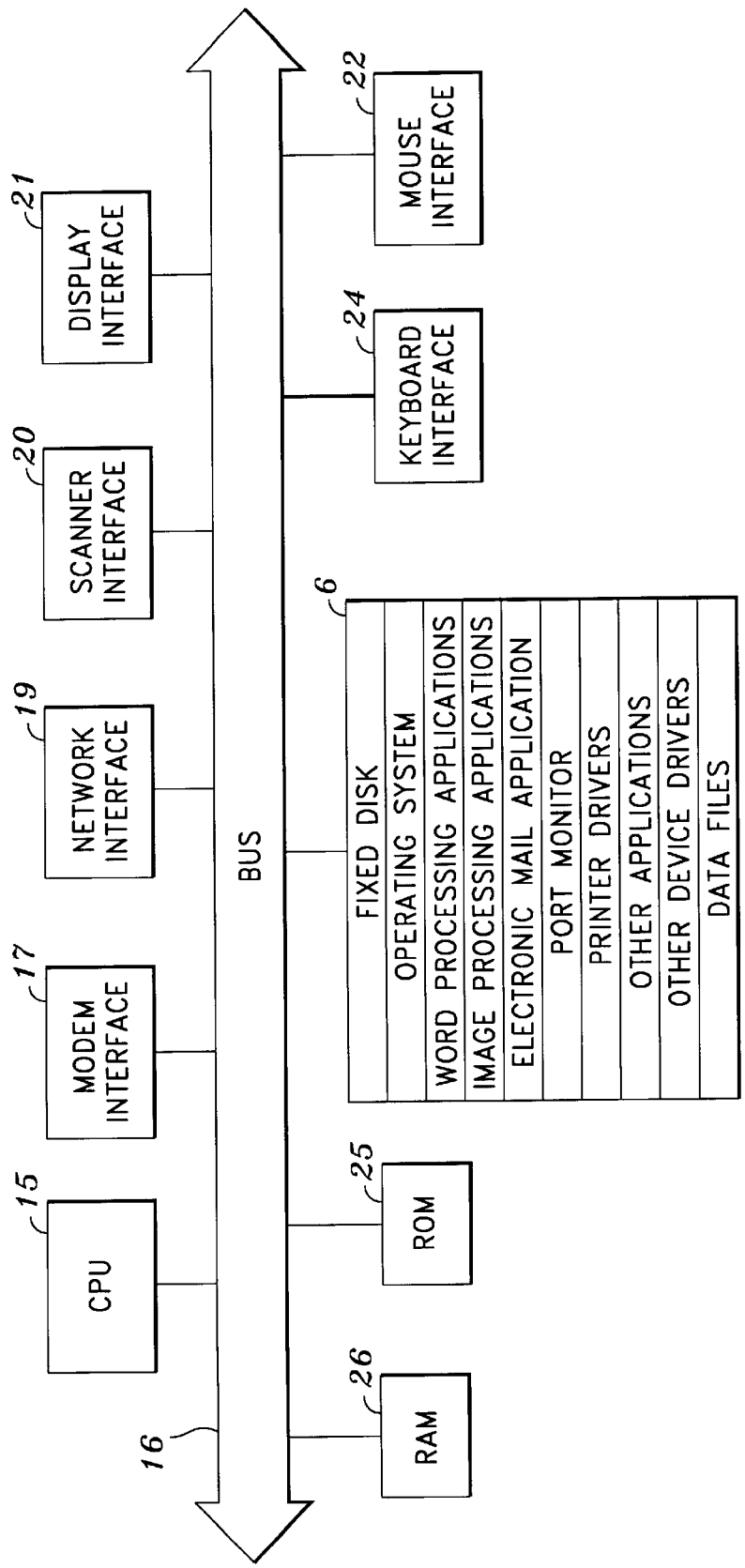
FIG. 2 is a block diagram of a personal computer internal architecture.

FIG. 2 is a block diagram of the internal architecture of computing equipment 1. Shown in FIG. 2 is CPU 15, which, as described above, is preferably a Pentium® processor. CPU 15 interfaces to computer bus 16, as does modem interface 17 for interfacing to telephone line 11, network interface 19 for interfacing to network connection 9, scanner interface 20 for communicating with scanner 10 and display interface 21 for interfacing to display 2. Mouse interface 22, which interfaces to mouse 5, and keyboard interface 24, which interfaces to keyboard 4, are also connected to bus 16. In this regard, interfaces 17 to 24 allow computing equipment 1 to access the functionality of their corresponding components.

Also shown in FIG. 2 is disk 6, having stored thereon the aforementioned windowing operating system, and computer-executable process steps of word processing applications, image processing applications, an electronic mail application, a port monitor and printer drivers. The stored printer drivers are used by applications to send data to a printer in a format usable by the printer. Accordingly, the printer driver generally receives data from an application requesting a print function, properly formats the data, and delivers the data to the port monitor. In this regard, the port monitor generally functions to send print jobs over a network. Further details of a printer driver according to the present invention and interaction with a port monitor are given below.

Read only memory (ROM) 25 stores invariant computer-executable process steps for basic system functions such as basic I/O, start-up, or reception of keystrokes from keyboard 4.

Random access memory (RAM) 26 provides CPU 15 with memory storage which can be accessed quickly. In this regard, computer-executable process steps of a printer driver, port monitor or other application are transferred from disk 6 over computer bus 16 to RAM 26 and executed therefrom by CPU 15.

Figure 3:
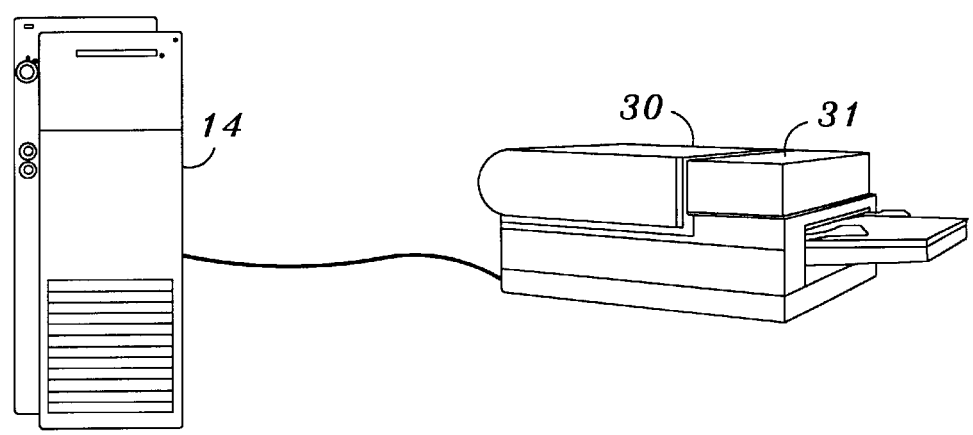
FIG. 3 is an outward view of a hardware configuration embodying the present invention.

FIG. 3 is an outward view of a hardware configuration utilizing the present invention. Shown in FIG. 3 is web server 14 connected to printer 30, which preferably is a high speed, high volume network printer. Of course, other types of printers can be used in keeping with the present invention. Shown on FIG. 3 is display panel 31, which displays instructions and information to a user and through which a user can input information and instructions to printer 30.

Connection 32 between server 14 and printer 30 is preferably a cabled Internet connection, but may also be a connection over the worldwide telephone network or other type of Internet connection.

Figure 4:
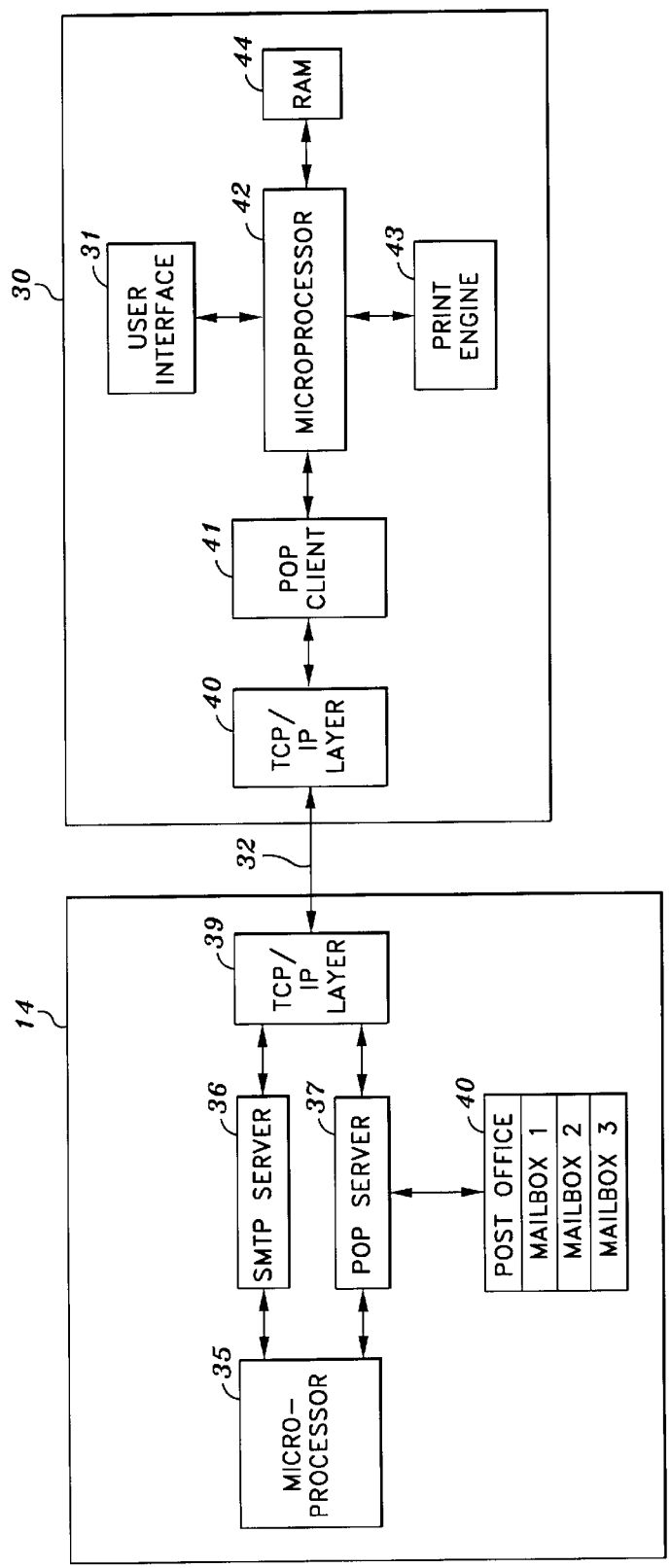
FIG. 4 is a functional block diagram of the FIG. 3 hardware configuration.

FIG. 4 is a functional block diagram of the FIG. 3 hardware configuration. As shown in FIG. 4, web server 14 includes microprocessor 35, which receives data from Simple Mail Transport Protocol (SMTP) server 36 and Post Office Protocol (POP) server 37 which was passed thereto by Transmission Control Protocol/Internet Protocol (TCP/IP) layer 39. Specifically, TCP/IP layer 39 receives IP data packets from connection 32, re-orders the packets, parses data therefrom and passes the data to an appropriate one of SMTP server 36 or POP server 37. It should be noted that TCP/IP layer 39 also receives data from the internet or Internet 12 as shown in FIG. 1. That is, data received from the Internet or from printer 30 is received by TCP/IP layer 39.

Microprocessor 35 is also connected to post office 40, which is a data repository storing data of electronic mailboxes. Microprocessor 35 accesses post office 40 to respond to requests or instructions received by SMTP server 36 and POP server 37.

Turning to printer 30, printer 30 also includes a TCP/IP layer 40 similar to TCP/IP layer 39. However, TCP/IP layer 40 receives data from and delivers data to POP client 41, which requests services from a POP server such as POP server 37. POP client 41 is controlled by microprocessor 42, which also controls display and reception of data from user interface 31. In addition, microprocessor 42 delivers print-rendered data to print engine 43 for printing.

Figure 5:
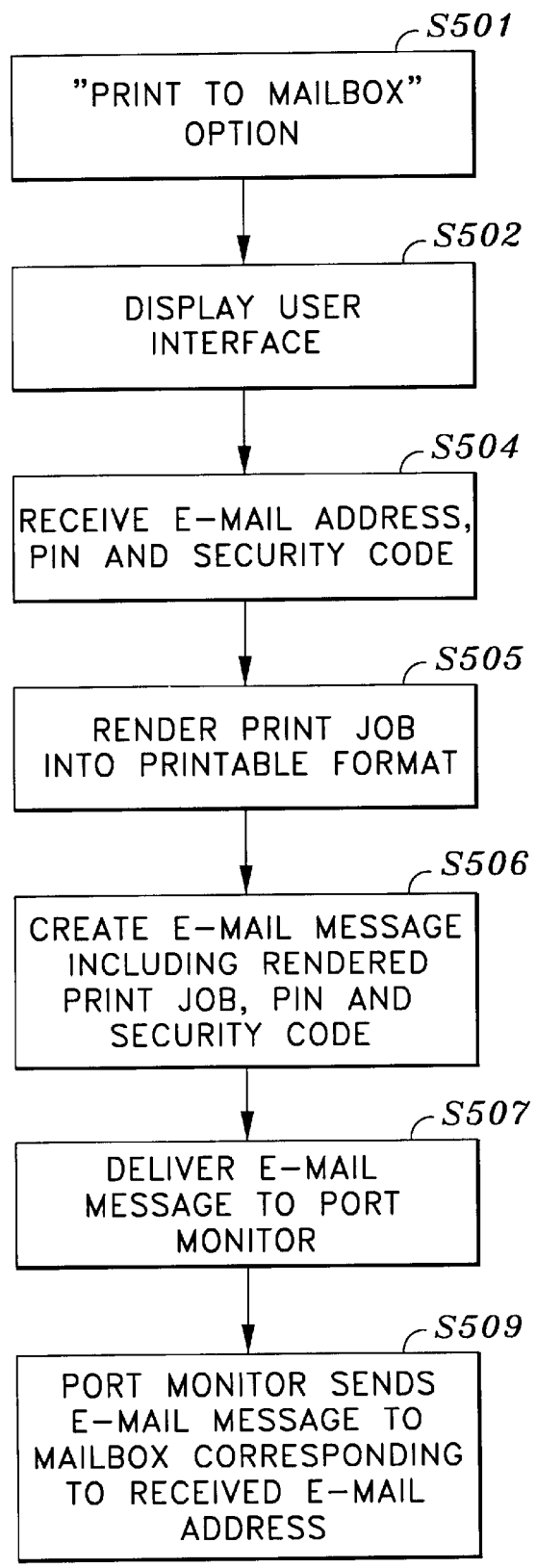
FIG. 5 is a flow diagram of computer-executable process steps to send a print job via email in accordance with the present invention.

FIG. 5 is a flow chart of processor-executable process steps to deliver a document for printing according to the present invention. Preferably, the FIG. 5 process steps are embodied in one or more of an application, a printer driver and a port monitor executed by CPU 15.

Briefly, the FIG. 5 process steps includes reception of an e-mail address, personal identification number (PIN) and security code corresponding to a print job, rendering of the print job into a printable format, creation of an e-mail message including the rendered document, PIN and security code, and delivery of the e-mail message to an electronic mailbox corresponding to the received e-mail address.

Specifically, the process steps begin at step S501, in which a user selects a Print To Mailbox option in a particular application executing on computing equipment 1. For example, in step S501, a user preparing a document using a word processing application selects a function to print the document using a Print icon in a toolbar or by selecting a Print option in a pull-down menu. In response, the application presents a Print dialog box to the user which includes an option to print to an electronic mailbox, and the user selects the option. In yet another embodiment, the above-mentioned pull-down menu or toolbar may include a Print To Mailbox option which is selected in step S501. In another embodiment, the default printer may be assigned such that any requested print function will default to printing to an electronic mailbox.

Figure 6:
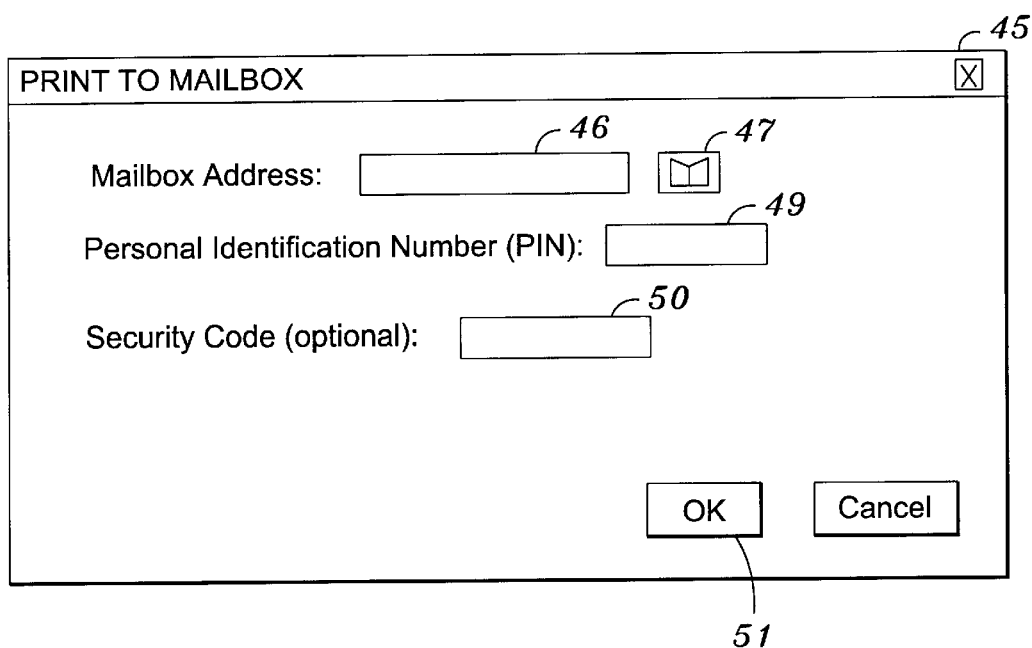
FIG. 6 is a view of a user interface window for use in conjunction with the present invention.

Regardless of the manner in which printing to an electronic mailbox is selected in step S501, a user interface is displayed in step S502. FIG. 6 is a representative example of a user interface which may be displayed to a user in step S502. User interface 45 is a window which is displayed on display monitor 2 in step S502. Included in window 45 is input area 46 in which a mailbox address may be input using keyboard 4 and/or pointing device 5. In this regard, button 47 brings up an electronic address book from which a mailbox address can be selected. Input area 49 is used to enter a Personal Identification Number (PIN), which is a password required to access the address entered in area 46. Finally, input area 50 is used to input a security code which corresponds to the print job to be printed. As shown in FIG. 6, entry of a security code in area 50 is optional.

Accordingly, in step S504, an e-mail address, PIN and security code are received after user selection of OK button 51 in window 45. In response, the print job is rendered into a format printable by the selected (or default) printer. For example, the print job may be rendered in step S505 into Printer Control Language (PCL), Page Description Format (PDF), Postscript (PS) or other suitable printer language.

Figure 7:
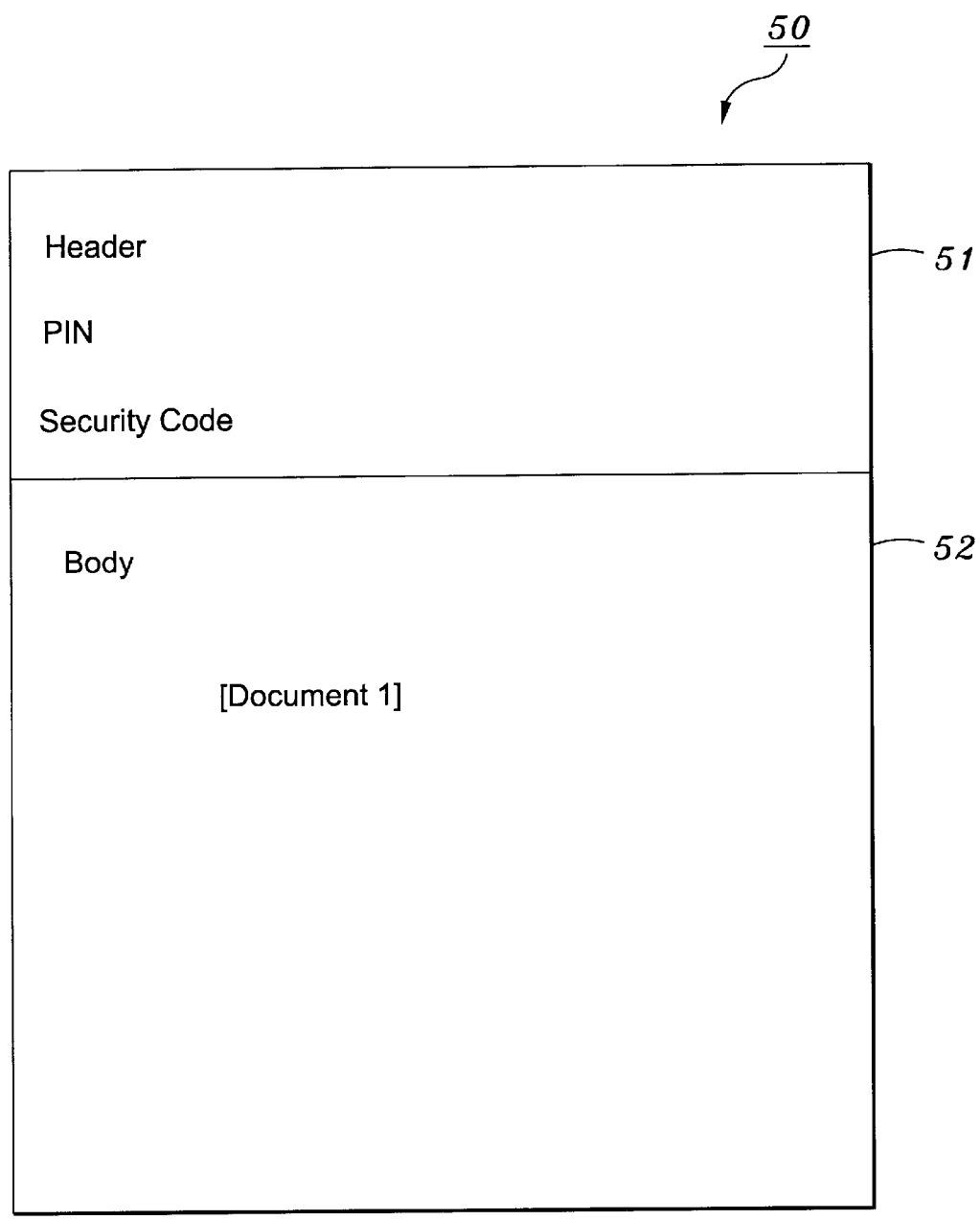
FIG. 7 is a representative diagram of an e-mail message.

In step S506, an e-mail message is then created including the rendered print job, and the PIN and security code received in step S504. FIG. 7 is a diagram illustrating an e-mail message created in step S506. In this regard, e-mail message 50 of FIG. 7 includes header 51 and body 52. In step S506, the received PIN and security code are included in header 51 and the rendered print job, here Document 1, is included in body 52. Of course, no security code is entered in header 51 if none was received in step S504.

Next, in step S507, the e-mail message is delivered to an SMTP component of a port monitor executing on computing equipment 1. In this regard, it is assumed for the present example that the port monitor of computing equipment 1 is used to send print jobs over a network, and that the port monitor includes an SMTP client capable of forwarding data to an SMTP server.

After the port monitor receives the e-mail message, the port monitor sends, in step S509, the e-mail message to an electronic mailbox corresponding to the e-mail address received in step S504. Preferably, a port monitor sends the e-mail message using an SMTP client component over TCP/IP protocol. The printer driver used to render the print job in step S505 may also include an SMTP client used in step S509.

Figure 8:
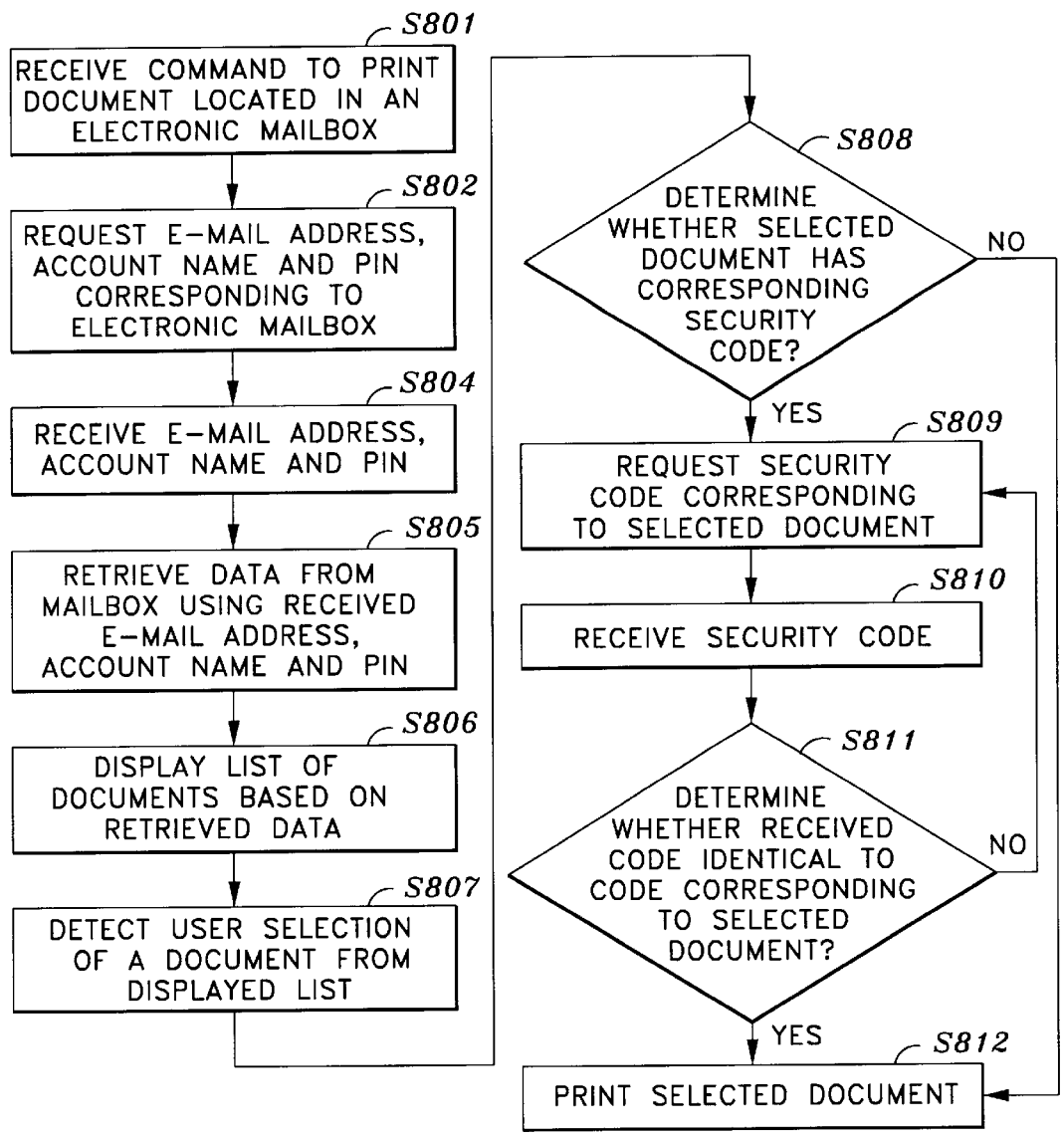
FIG. 8 is a flow diagram of computer-executable process steps to print a document from an electronic mailbox in accordance with the present invention.

FIG. 8 is a flow chart of process steps executable by a printer to print a secure print job in accordance with the present invention. Preferably, the FIG. 8 process steps are embodied in computer-executable process steps stored in RAM 44 and executed therefrom by microprocessor 42.

Generally, the FIG. 8 process steps include reception of an e-mail address and PIN, reception of data from an electronic mailbox using the retrieved e-mail address and PIN, display of a list of documents based on the retrieved data, detection of a selection of a document from the displayed list and print out of the document.

The FIG. 8 process begins at step S801, wherein a printer receives a command to print a document located in an electronic mailbox. The command is preferably received from a user through manipulation of user interface 31. After reception of the command in step S801, flow proceeds to step S802, wherein the printer requests an e-mail address, account name and a PIN corresponding to the electronic mailbox.

Figure 9:
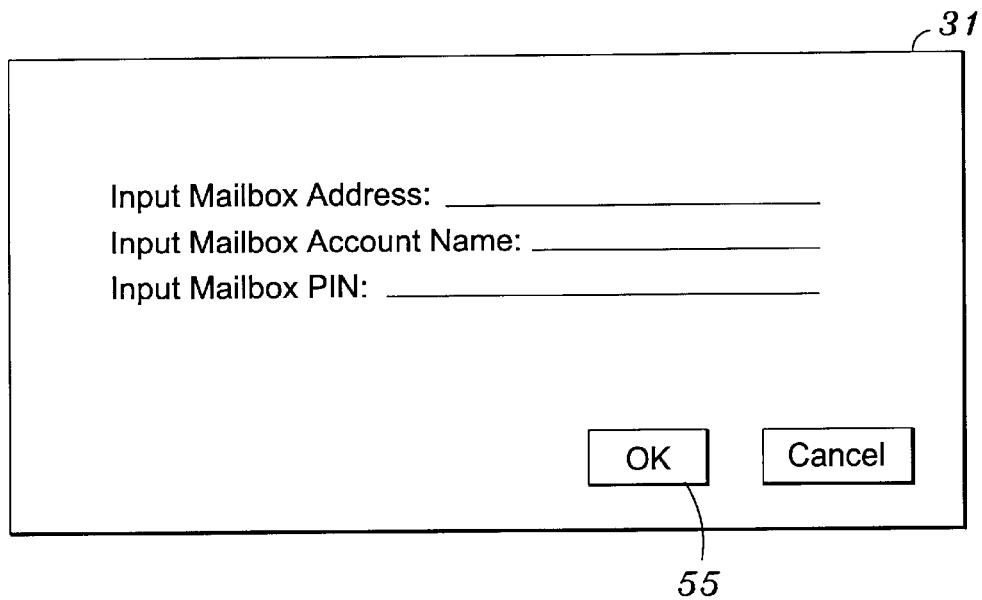
FIG. 9 is a view of a printer user interface display in accordance with the present invention.

FIG. 9 is a view of display 31 requesting information according to step S802. Using a physical or virtual keyboard, or some other data entry means, a user enters an address, account name and PIN in user interface 31 and selects OK button 55. As a result, the e-mail address, account name and PIN are received in step S804.

Next, using the e-mail address, account name and PIN, the mailbox is accessed and data is received therefrom in step S805. Using the FIG. 4 embodiment as an example, microprocessor 42 executes process steps from RAM 44 in step S805 so as to pass the e-mail address, account name and PIN to POP client 41 and to instruct the POP client 41 to retrieve data from the corresponding mailbox. In this regard, retrieval of information from a mailbox using a corresponding e-mail address, account name and PIN is a standard feature of a POP client.

In order for POP client 41 to retrieve the information from the corresponding mailbox, POP client 41 must first locate the POP server, such as POP server 37. Locating the POP server is dependent upon the POP server's domain and the users e-mail domain. In more detail, a POP server is generally set with a default domain by a system administrator. When the user enters the e-mail address at display 31, POP client 41 utilizes the entered domain to locate a POP server with a corresponding domain.

If the domain of POP server 37 of web server 14 corresponds to the address domain received by POP client 41, then POP server 37 receives the request from POP client 41 and data is retrieved from a corresponding mailbox in post office 40.

If however, the domain entered by the user does not correspond to the domain of POP server 37, then the user is prompted to enter the POP server location manually from display 31.

Alternatively, the POP server may be configured to automatically seek the POP server location. In this case, the printer scans the e-mail address entered by the user to obtain the domain. The printer then obtains the SMTP server location from the domain DNS server. The printer attempts to utilize the SMTP server location as the POP server address. In this regard, it should be noted that the DNS server does not define the POP server address, but it is usually the same as the SMTP server. If the SMTP server location does not support POP or does not have the user account, then the user is prompted to manually enter the POP server location from display 31.

Figure 10:
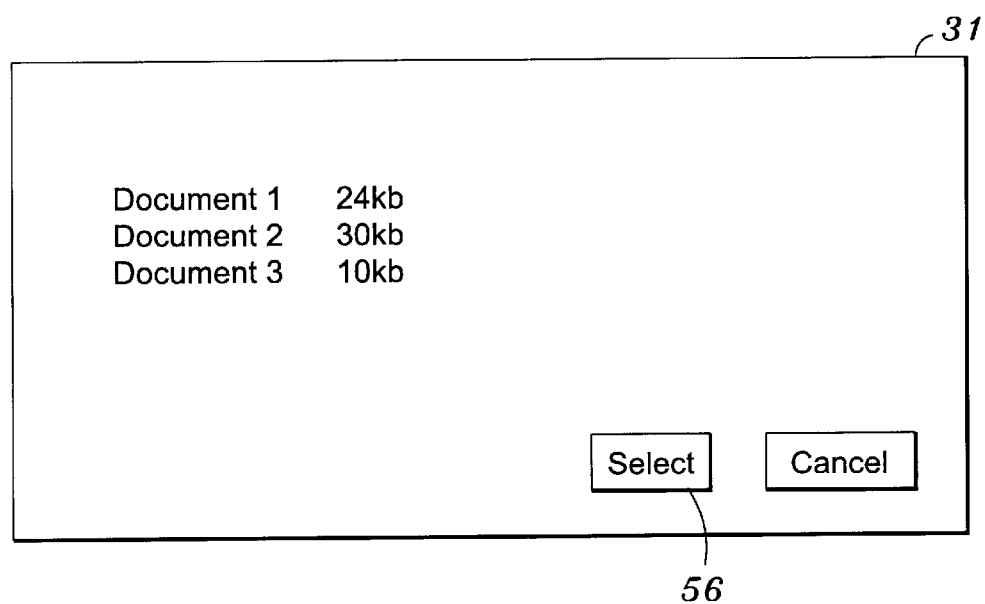
FIG. 10 is a view of a printer user interface display in accordance with the present invention.
Figure 11:
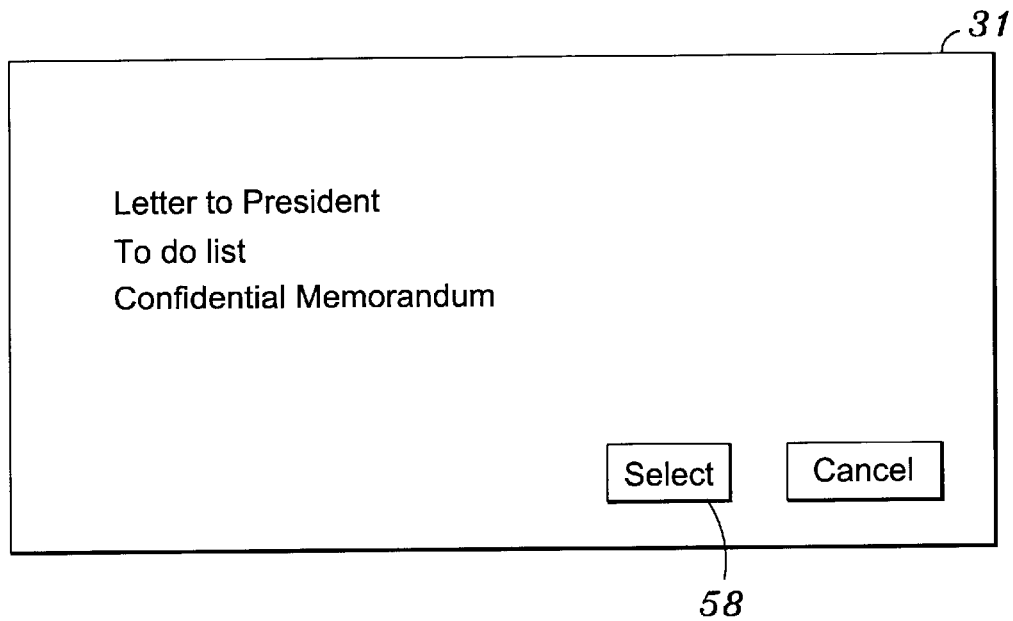
FIG. 11 is a view of a printer user interface display in accordance with the present invention.

After step S805, a list of documents is displayed based on the retrieved data in step S806. FIG. 10 shows such a list displayed on user interface 31. In this regard, it should be noted that according to the POP specification, message contents or subjects are not sent to a POP client in response to an initial request such as that described above with respect to step S805. Rather, only random codes and sizes of files located in the corresponding mailbox are returned. Accordingly, the list shown in FIG. 10 consists merely of document names created by printer 30 along with their corresponding file sizes. In an alternative embodiment shown in FIG. 11, descriptive information of documents located in a subject mailbox is displayed. To create such a list, it would be necessary to include such information in header 51 of each e-mail message stored in the mailbox. Such information could be entered into window 45 by a user and included in header 51 by a print driver executing step S506. Then, in step S805, POP client 41 would retrieve only the header information from the appropriate mailbox in post office 40 and the included information would be parsed out of the header for display on user interface 31. In this regard, retrieval of header information is a conventional function of a POP client.

User selection of a file from the displayed list is detected in step S807. Such a selection can be made by touching an area of user interface 31 in which a corresponding document name is displayed and thereafter touching Select button 58. Of course, any other known method for detecting user selection of a listed item can be used in step S807.

Next, in step S808, it is determined whether the selected document has a corresponding security code. Since, in the present invention, any assigned security code is located in header 51 of an e-mail message containing the selected document, at least header 51 of the e-mail message must be retrieved in or before step S808. If a corresponding security code exists, flow proceeds to step S809.

Figure 12:
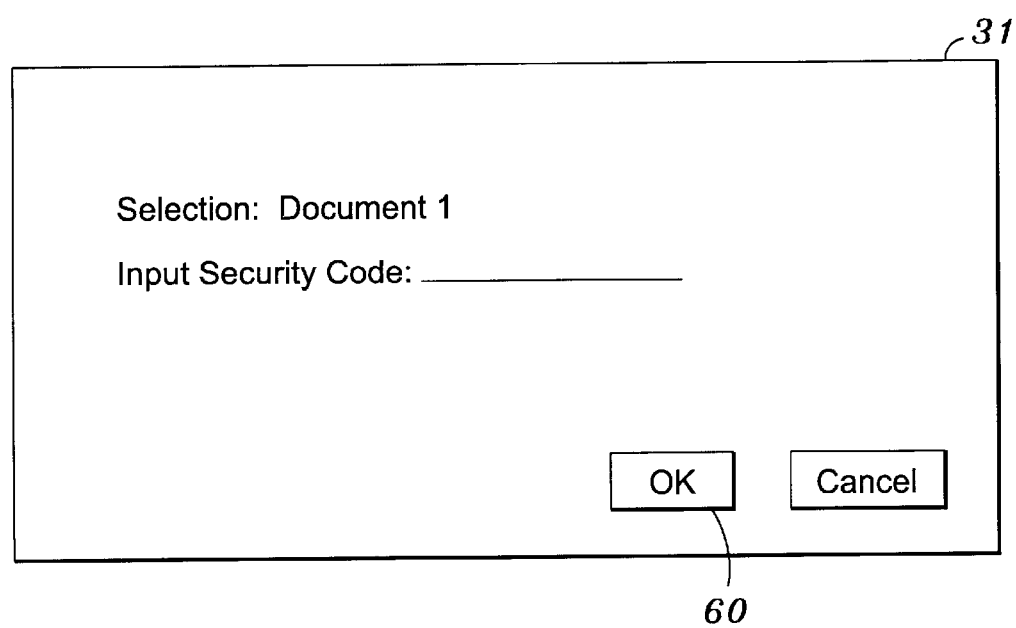
FIG. 12. is a view of a printer user interface display in accordance with the present invention.

In step S809, the user is requested to enter a security code for the selected document. FIG. 12 illustrates one example for requesting a security code according to step S809. As shown, user interface 31 indicates the selected document and provides an area in which to input a security code corresponding to the document. Once the security code is input and OK button 60 is selected, the security code is received in step S810. Accordingly, in step S811, it is determined whether the received security code is identical to the code corresponding to the selected document, which was preferably received in step S808. If not, the process returns to step S809 wherein the security code is again requested. If so, the selected document is printed in step S812.

If it is determined in step S808 that the selected document does not have a corresponding security code, flow immediately proceeds to step S812. Therein, if body 52 of the e-mail message corresponding to the selected document has not yet been retrieved by POP client 41, the body is retrieved in step S812 prior to printing the document. As mentioned above, the document included in body 52 is already rendered for printing by printer 30. Accordingly in step S812, the document is sent directly to print engine 43 for printing without requiring further processing.

While the present invention is described above with respect to what is currently considered its preferred embodiments, it is to be understood that the invention is not limited to that described above. To the contrary, the invention is intended to cover various modifications and equivalent arrangements included within the spirit and scope of the appended claims.

What is claimed is:

1. A method usable by a printing device for printing a document, comprising the steps of:
   the printing device receiving a command, input at the printing device, to print a document located in an electric mailbox;
   the printing device requesting the input of an e-mail address, a user ID and a password corresponding to an e-mail account of the electronic mailbox, after receiving said command;
   the printing device displaying a list of documents stored in the electronic mailbox;
   the user selecting the document from the list;
   the user inputting a first security code into the printing device;
   the printing device determining whether the first security code is identical to a second security code corresponding to the document;
   the printing device retrieving, based on information input in response to the requesting step, the document from the electronic mailbox corresponding to the e-mail account; and
   the printing device printing the document.

2. Computer-executable process steps stored on a computer-readable medium, the process steps usable by a printing device to print a document, the process steps comprising:
   the printing device receiving a command, input at the printing device, to print a document located in an electronic mailbox;
   the printing device requesting the input of an e-mail address, a user ID and a password corresponding to an e-mail account of the electronic mailbox, after receiving the command;
   the printing device displaying a list of documents stored in the electronic mailbox;
   the user selecting the document from the list;
   the user inputting a first security code into the printing device;
   the printing device determining whether the first security code is identical to a second security code corresponding to the document;
   the printing device retrieving, based on information input in response to the requesting step, the document from the electronic mailbox corresponding to the e-mail account; and
   the printing device printing the document.

3. A method for printing a document, comprising the steps of:
   in a host computer, performing the steps of:
      selecting a printing option for printing the document to an electronic mailbox corresponding to an e-mail account;
      inputting an e-mail address corresponding to the e-mail account of the electronic mailbox that the document is to be printed to; and
      sending the document to the electronic mailbox of the e-mail account corresponding to the input e-mail address; and
   in a printing device, performing the steps of:
      the printing device receiving a command for printing a document located in an electronic mailbox;
      the printing device requesting the input of an e-mail address, a user ID and a password corresponding to an e-mail account of the electronic mailbox, and a first security code corresponding to the document;
      the printing device displaying a list of documents stored in the electronic mailbox;
      the user selecting the document from the list;
      the user inputting a second security code into the printing device;
      the printing device determining whether the first security code is identical to a second security code corresponding to the document;
      the printing device retrieving, based on information input in response to the requesting step, the document from the electronic mailbox corresponding to the e-mail account; and
      the printing device printing the document.

4. Computer-executable process steps stored on a computer-readable medium, the process steps usable by a printing device to print a document, the process steps comprising the steps of:

in a host computer, performing the steps of:
selecting a printing option for printing the document to an electronic mailbox corresponding to an e-mail account;
inputting an e-mail address corresponding to the e-mail account of the electronic mailbox that the document is to be printed to; and
sending the document to the electronic mailbox of the e-mail account corresponding to the input e-mail address; and
in a printing device, performing the steps of:
the printing device receiving a command for printing a document located in an electronic mailbox;
the printing device requesting the input of an e-mail address, a user ID and a password corresponding to an e-mail account of the electronic mailbox, and a first security code corresponding to the document;
the printing device displaying a list of documents stored in the electronic mailbox;
the user selecting the document from the list;
the user inputting a second security code into the printing device;
the printing device determining whether the first security code is identical to a second security code corresponding to the document;
the printing device retrieving, based on information input in response to the requesting step, the document from the electronic mailbox corresponding to the e-mail account; and
the printing device printing the document.

5. A method according to claim 1, wherein the document is stored in the electronic mailbox in a printer-ready format that comprises a printer definition language.

6. A method according to claim 5, wherein the printer definition language comprises one of a Printer Control Language (PCL), a Page Description Format (PDF), or Postscript (PS).

7. A method according to claim 1, wherein the document is rendered in the printer-ready format before being stored in the electronic mailbox of the e-mail account.

8. Computer-executable process steps according to claim 2, wherein the document is stored in the electronic mailbox in a printer-ready format that comprises a printer definition language.

9. Computer-executable process steps according to claim 8, wherein the printer definition language comprises one of a Printer Control Language (PCL), a Page Description Format (PDF), or Postscript (PS).

10. Computer-executable process steps according to claim 2, wherein the document is rendered in the printer-ready format before being stored in the electronic mailbox of the e-mail account.

11. A method according to claim 3, wherein the document is stored in the electronic mailbox in a printer-ready format that comprises a printer definition language.

12. A method according to claim 11, wherein the printer definition language comprises one of a Printer Control Language (PCL), a Page Description Format (PDF), or Postscript (PS).

13. A method according to claim 3, wherein the document is rendered in the printer-ready format before being stored in the electronic mailbox of the e-mail account.

14. Computer-executable process steps according to claim 4, wherein the document is stored in the electronic mailbox in a printer-ready format that comprises a printer definition language.

15. Computer-executable process steps according to claim 14, wherein the printer definition language comprises one of a Printer Control Language (PCL), a Page Description Format (PDF), or Postscript (PS).

16. Computer-executable process step according to claim 4, wherein the document is rendered in the printer-ready format before being stored in the electronic mailbox of the e-mail account.

17. A method usable by a printing device for printing a document, comprising the steps of:
the printing device requesting the input of information corresponding to an e-mail account of an electronic mailbox;
the printing device displaying a list of documents stored in the electronic mailbox;
the printing device detecting a user selection of a document from the displayed list;
the printing device receiving a first security code corresponding to the selected document;
the printing device determining whether the first security code is identical to a second security corresponding to the document;
the printing device retrieving, based on information input in response to the requesting step, the document from the electronic mailbox corresponding to the e-mail account; and
the printing device printing the document.

18. A printing device, comprising:
a requesting unit that requests the input of information corresponding to an e-mail account of an elelctronic mailbox;
a display unit that displays a list of documents stored in the electronic mailbox;
a detecting unit that detects a user selection of a document from the displayed list;
a receiving unit that receives a first security code corresponding to the selected document;
a determining unit that determines whether the first security code is identical to a second security corresponding to the document;
a retrieving unit that retrieves, based on information input in response to the request of the requesting unit, the document from the electronic mailbox corresponding to the e-mail account; and
a printing unit that prints the document.

19. Computer-executable process steps stored on a computer-readable medium, the process steps usable by a printing device for printing a document, the process steps comprising the steps of:
the printing device requesting the input of information corresponding to an e-mail account of an electronic mailbox;
the printing device displaying a list of documents stored in the electronic mailbox;
the printing device detecting a user selection of a document from the displayed list;
the printing device receiving a first security code corresponding to the selected document;
the printing device determining whether the first security code is identical to a second security corresponding to the document;
the printing device retrieving, based on information input in response to the requesting step, the document from the electronic mailbox corresponding to the e-mail account; and
the printing device printing the document.

* * * * *

UNITED STATES PATENT AND TRADEMARK OFFICE
CERTIFICATE OF CORRECTION

PATENT NO. : 6,801,935 B2
DATED : October 5, 2004
INVENTOR(S) : Shen

It is certified that error appears in the above-identified patent and that said Letters Patent is hereby corrected as shown below:

Title page,
Item [56] References Cited, U.S. PATENT DOCUMENTS, insert,
-- 6,615,234 B1 * 9/2003 Adamske et al. ......709/203 --; and
-- 6,092,104 * Kelly ......709/206 --.

Column 2,
Line 25, "an" should read -- a --; and
Line 46, "email" should read -- e-mail --.

Column 4,
Line 49, "includes" should read -- include --.

Column 6,
Line 24, "users" should read -- user's --.

Column 8,
Line 45, "command for printing" should read -- command, input at the printing device, to print --.

Column 9,
Line 11, "command for printing" should read -- command, input at the printing device, to print --.

Column 10,
Lines 17, 36 and 58, "security" should read -- security code --; and
Line 27, "elelctronic" should read -- electronic --.

Signed and Sealed this

Twenty-second Day of March, 2005

JON W. DUDAS
*Director of the United States Patent and Trademark Office*